US010504559B2

(12) United States Patent
Takahashi (10) Patent No.: US 10,504,559 B2
(45) Date of Patent: Dec. 10, 2019

(54) RECORDED DATA PROCESSING METHOD AND RECORDED DATA PROCESSING DEVICE

(71) Applicant: YAMAHA CORPORATION, Shizuoka (JP)

(72) Inventor: Yu Takahashi, Shizuoka (JP)

(73) Assignee: YAMAHA CORPORATION, Shizuoka (JP)

(*) Notice: Subject to any disclaimer, the term of this patent is extended or adjusted under 35 U.S.C. 154(b) by 0 days.

(21) Appl. No.: 16/126,155

(22) Filed: Sep. 10, 2018

(65) Prior Publication Data

US 2019/0005985 A1 Jan. 3, 2019

Related U.S. Application Data

(63) Continuation-in-part of application No. PCT/JP2017/008272, filed on Mar. 2, 2017.

(30) Foreign Application Priority Data

Mar. 9, 2016 (JP) .................. 2016-045132

(51) Int. Cl.
*H04N 5/91* (2006.01)
*G11B 27/10* (2006.01)
(Continued)

(52) U.S. Cl.
CPC ........ *G11B 27/10* (2013.01); *G11B 20/10527* (2013.01); *G11B 27/02* (2013.01);
(Continued)

(58) Field of Classification Search
None
See application file for complete search history.

(56) References Cited

U.S. PATENT DOCUMENTS

2005/0008329 A1* 1/2005 Suzuki ................. G11B 27/034
386/355
2013/0121668 A1 5/2013 Meaney et al.
(Continued)

FOREIGN PATENT DOCUMENTS

CN 103931199 A 7/2014
EP 3012838 A1 4/2016
(Continued)

OTHER PUBLICATIONS

International Search Report and Written Opinion of PCT Application No. PCT/JP2017/008272, dated May 30, 2017, 02 page of English Translation and 06 pages of ISRWO.

*Primary Examiner* — Eileen M Adams
(74) *Attorney, Agent, or Firm* — Chip Law Group (57) ABSTRACT

A recorded data processing method includes calculating, for each of N (N is a natural number of three or more) recorded data pairs each formed by two pieces of recorded data that are adjacent to each other when N pieces of recorded data each representing a recording target including at least one of audio or an image are arranged cyclically, a time difference between time signals representing temporal changes of the recording target in the two respective pieces of recorded data of the recorded data pair. It is also evaluated whether or not the N pieces of recorded data include recorded data having no relation according to a total value of N time differences calculated for the N recorded data pairs.

11 Claims, 5 Drawing Sheets

(51) Int. Cl.
*G11B 20/10* (2006.01)
*G11B 27/02* (2006.01)

(52) U.S. Cl.
CPC ..... *H04N 5/91* (2013.01); *G11B 2020/10537* (2013.01); *G11B 2020/10944* (2013.01)

(56) References Cited

U.S. PATENT DOCUMENTS

| | | |
|---|---|---|
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2017/0018290 A1* | 1/2017 | Hendry ................ G11B 27/105 |

FOREIGN PATENT DOCUMENTS

| | | |
|---|---|---|
| JP | 2002-016868 A | 1/2002 |
| JP | 2004-247937 A | 9/2004 |
| JP | 2006-115152 A | 4/2006 |
| JP | 2008-193561 A | 8/2008 |
| JP | 2010-245856 A | 10/2010 |
| JP | 2012-094067 A | 5/2012 |
| JP | 2015-504629 A | 2/2015 |
| WO | 2013/074207 A1 | 5/2013 |

* cited by examiner

FIG.9

RECORDED DATA PROCESSING METHOD AND RECORDED DATA PROCESSING DEVICE

CROSS-REFERENCE TO RELATED APPLICATIONS

This application is a continuation-in-part application of International Application No. PCT/JP2017/008272, filed Mar. 2, 2017, which claims priority to Japanese Patent Application No. 2016-045132 filed in Japan on Mar. 9, 2016. The entire disclosures of International Application No. PCT/JP2017/008272 and Japanese Patent Application No. 2016-045132 are hereby incorporated herein by reference.

BACKGROUND

The present technology relates to a processing recorded data.

Various technologies have been proposed for processing mutual temporal relation between a plurality of pieces of recorded data including video and audio. For example, Japanese Laid-Open Patent Application No. 2008-193561 (hereinafter referred to as Patent Document 1) discloses technologies for analyzing a plurality of pieces of audio data each recorded at a time of capturing of a plurality of video obtained by capturing a same subject from different positions, and thereby generates time difference information for synchronizing the plurality of videos. Specifically, the time difference information is generated according to a shift time that maximizes a cross-correlation function between two pieces of audio data.

SUMMARY

A recorded data processing method in accordance with some embodiments including calculating, for each of N (N is a natural number of three or more) recorded data pairs each formed by two pieces of recorded data that are adjacent to each other when N pieces of recorded data each representing a recording target including at least one of audio or video are arranged cyclically, a time difference between time signals representing temporal changes of the recording target in the two respective pieces of recorded data of the recorded data pair.

In accordance with an embodiment, the recorded data processing method further includes evaluating whether or not the recorded data having no relevance among N pieces of recorded data according to a total value of N time differences calculated for the N recorded data pairs.

DESCRIPTION OF EMBODIMENTS

In conventional systems, there is a possibility that recording data may include some non-related recording data and some related recording data. In the patent document 1, some shift times are calculated even when the recorded data to be analyzed include non-related data. In view of the above circumstances, it is an object of some embodiments to evaluate appropriately whether or not the recorded data has any relevance among a plurality of recorded data.

Selected embodiments will now be explained with reference to the drawings. It will be apparent to those skilled in the audio field from this disclosure that the following descriptions of the embodiments are provided for illustration only and not for the purpose of limiting the invention as defined by the appended claims and their equivalents.

First Embodiment

Figure 1:
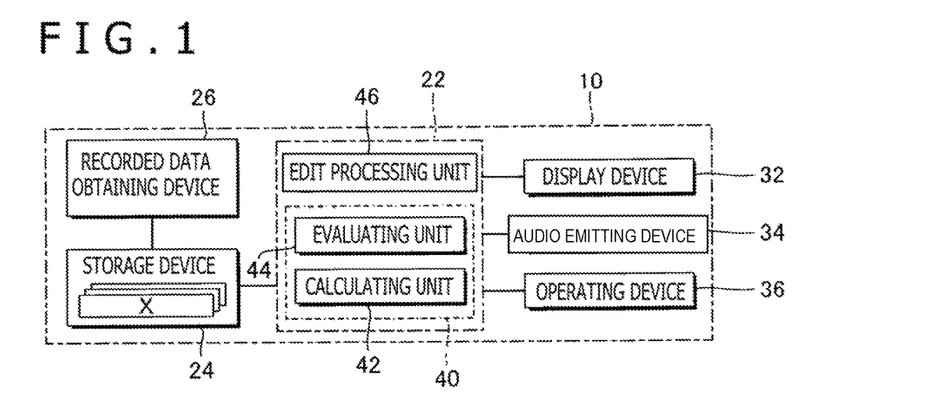
FIG. 1 is a block diagram of a recorded data editing system according to a first embodiment.

FIG. 1 is a block diagram of a recorded data editing system 10 according to a first embodiment. The recorded data editing system 10 is a computer system for processing audio (for example, voice or musical audio) and video. As illustrated in FIG. 1, the recorded data editing system 10 includes an electronic controller 22, a storage device 24, a recorded data obtaining device 26, a display device 32, a audio emitting device 34, and an operating device 36. In some embodiments, the recorded data editing system 10 can be suitably implemented by a portable information processing device such, for example, as a cellular phone, a smart phone, a tablet terminal, a personal computer, or the like. However, the recorded data editing system 10 can also be implemented by a stationary information processing device.

The term "electronic controller" as used herein refers to hardware that executes software programs.

The electronic controller 22 includes processing device (for example, a central processing unit (CPU)) that controls the elements of the recorded data editing system 10. The recorded data obtaining device 26 obtains recorded data X1 to XN resulting from capturing by N recording devices, individually. The recording devices are video apparatuses including a audio collecting device collecting audio and a video device collecting video by capturing video. Movie data includes audio data and video data. The recorded data is audio data or movie data. The recording devices are, for example, video apparatuses such as digital camcorders or the like and information terminals such as mobile telephones, smart phones, or the like having a recording function. Recorded data X is data representing audio or movie (audio and video) recorded by a recording device.

The recorded data obtaining device 26 in the first embodiment obtains N pieces of recorded data X1 to XN (N is a natural number of three or more). Specifically, the recorded data obtaining device 26 can obtain the N pieces of recorded data X1 to XN from the respective recording devices by publicly known short-range radio communication such, for example, as wireless fidelity (Wi-Fi) (registered trademark), Bluetooth (registered trademark), or the like, or obtain the recorded data X recorded by each of the recording devices from a storage device storing the recorded data X via a communication network such as the Internet or the like.

The storage device 24 is formed by recording medium such, for example, as a magnetic recording medium, a semiconductor recording medium, or the like. The storage device 24 stores a program executed by the electronic controller 22 and various kinds of data used by the electronic controller 22. The storage device 24 in the first embodiment stores the N pieces of recorded data X1 to XN obtained by the recorded data obtaining device 26. It is also possible to store the N pieces of recorded data X1 to XN in the storage device 24 in advance. In this case, the recorded data obtaining device 26 can be omitted from the recorded data editing system 10. In addition, it is possible to install the storage device 24 in a server with which the recorded data editing system 10 can communicate (that is, a cloud storage). In this case, the storage device 24 can be omitted from the recorded data editing system 10.

The plurality of recording devices, for example, record, in parallel with each other, audio and video as a common recording target (recording object) at mutually different positions. For example, the plurality of recording devices are arranged at mutually different positions in a common acoustic space such as a hall, a concert hall, a dance hall or the like, and each of the plurality of recording devices generates the recorded data X by recording a state of a stage and audience, for example, from a different angle. The recorded data X in the first embodiment represents the recording target including the audio collected by an audio collecting device and the video collected by an video device. Specifically, the recorded data X includes a audio signal representing temporal changes in the audio collected by the audio collecting device and a video signal representing temporal changes captured by the video device (that is, a movie). For example, in a case where the played audio of a musical piece for a play performed on a stage is reproduced from a audio emitting device (for example, a speaker) installed on the stage, the audio of the recorded data X recorded by each of the recording devices commonly includes the played audio (though audio characteristics such as volume and the like can differ). Incidentally, while the recording target including both the audio and the image is illustrated, a recording target including only one of audio and an image can also be assumed.

A user of each recording device separately starts recording by the own recording device. Hence, a start point of recording of the audio and the moving image does not precisely coincide between the N pieces of recorded data X1 to XN, but can differ for each piece of recorded data X. That is, there are time differences between the N pieces of recorded data X1 to XN.

The storage device 24 basically stores the N pieces of recorded data X1 to XN having relation to each other. However, there is a possibility that due to a mistake in operation of a user of a recording device or the like, for example, recorded data X having no relation to the other recorded data X may be mixed in the N pieces of recorded data X1 to XN stored in the storage device 24. The pieces of recorded data X having relation to each other, for example, have relation such that one of or both a subject and a location are mutually common or related (relation in terms of content) and recording periods of the pieces of recorded data X partly overlap each other on a time axis (relation in terms of time). For example, relation is ensured between N−1 pieces of recorded data X1 to XN−1 recorded by reliable users (for example, persons concerned in an event) so as to be related to each other in terms of content and time. In addition, when a case is assumed in which data indicating recording positions or recording times is added to the recorded data X, N−1 pieces of recorded data X1 to XN−1 having relation to each other can be secured by analyzing commonality between the recording positions or the recording times. On the other hand, recorded data XN having no relation is recorded data X that does not have at least one of relation in terms of content and relation in terms of time. The recorded data XN having no relation is, for example, recorded data X obtained by performing recording in a same period as the recording periods of the other recorded data X1 to XN−1 but recording a state of a different event (in a case of a different subject), or recorded data X obtained by recording the same event but starting the recording after an end of recording for the other recorded data X1 to XN−1 (in a case where the recording period does not partially overlap on the time axis). That is, the recorded data XN having no relation does not include common audio included in the other plurality of pieces of recorded data X1 to XN−1. The first embodiment assumes a case where the N pieces of recorded data X1 to XN include the N−1 pieces of recorded data X1 to XN−1 having relation to each other and one piece of recorded data XN having unknown relation to the N−1 pieces of recorded data X1 to XN−1. The N−1 pieces of recorded data X1 to XN−1 are recorded data X whose mutual relation is confirmed in advance by an arbitrary method.

The display device 32 (for example, a liquid crystal display panel) in FIG. 1 displays an image specified from the electronic controller 22. The audio emitting device 34 (for example, a speaker or headphones) emits audio specified from the electronic controller 22. The operating device 36 is an input apparatus receiving an instruction from a user. The operating device 36 is, for example, formed by a plurality of operating elements detecting operations by the user or a touch panel detecting contact of the user with a display surface of the display device 32.

The electronic controller 22 implements a plurality of functions (a recorded data analyzing unit 40 and an edit processing unit 46) for processing the N pieces of recorded data X1 to XN by executing the program stored in the storage device 24. Incidentally, it is also possible to adopt a configuration in which some of the functions of the electronic controller 22 are implemented by an electronic circuit dedicated to audio processing or image processing or a configuration in which the functions of the electronic controller 22 are distributed to a plurality of devices.

Figure 2:
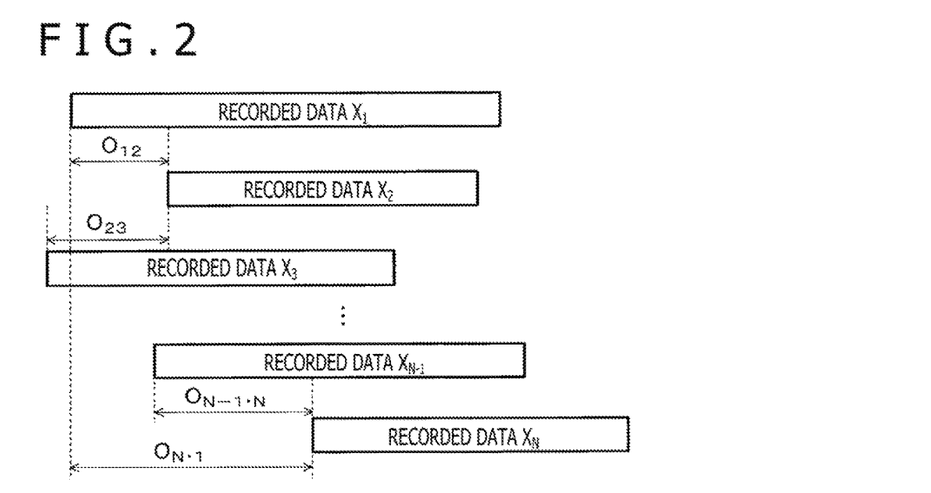
FIG. 2 is a view illustrating N pieces of recorded data having relation to each other.

As illustrated in FIG. 2, the recorded data analyzing unit 40 determines a time difference Oij (i, j=1 to N, i≠j) between two pieces of recorded data Xi and Xj that are adjacent to each other when the N pieces of recorded data X1 to XN generated by the recording devices are arranged cyclically, and evaluates whether or not the N pieces of recorded data X1 to XN include the recorded data XN having no relation from a total value S of time differences Oij. The cyclic arrangement of the N pieces of recorded data X1 to XN means an arrangement (annular arrangement) in which the N pieces of recorded data X1 to XN are arranged in series with each other and the first recorded data X1 is made to follow the last recorded data XN. Hence, the cyclic arrangement of the N pieces of recorded data X1 to XN includes a pair (hereinafter referred to as a "recorded data pair") Pij formed by two pieces of recorded data Xi and Xj adjacent to each other. That is, there are N combinations between the numerical value i and the numerical value j: (i, j)=(1, 2), (2, 3), . . . , (N−1, N), (N, 1). That is, the N pieces of recorded data include N recorded data pairs P12 to PN·1. As is understood from FIG. 2, the time difference Oij means a relative time (offset) of the recorded data Xj when the recorded data Xi is set as a reference. Incidentally, the permutation of the N pieces of recorded data X1 to XN arranged cyclically is arbitrary.

As illustrated in FIG. 1, the recorded data analyzing unit 40 in the first embodiment includes a calculating unit 42 and an evaluating unit 44. For each of the N recorded data pairs P12 to PN·1 each formed by two pieces of recorded data Xi and Xj that are adjacent to each other when the N pieces of recorded data X1 to XN are arranged cyclically, the calculating unit 42 calculates a time difference Oij between audio signals (an example of time signals) in the two respective pieces of recorded data Xi and Xj of the recorded data pair Pij.

Specifically, for each of the N recorded data pairs P12 to PN·1, the calculating unit 42 calculates a time difference $\tau$ maximizing an absolute value $|Cij(\tau)|$ of a audio signal cross-correlation $Cij(\tau)$ between the recorded data Xi and the recorded data Xj as the time difference Oij of the recorded data pair Pij. As expressed by the following Equation (1), the cross-correlation $Cij(\tau)$ is a numerical string indicating a degree of time waveform correlation between a audio signal yi(t) included in the recorded data Xi and a audio signal yj(t) included in the recorded data Xj with a time difference (amount of shift on the time axis) $\tau$ of the audio signal yj(t) with respect to the audio signal yi(t) as a variable after a starting point of the audio signal yi(t) and a starting point of the audio signal yj(t) are made to coincide with each other on the time axis. In a case where the recorded data Xi and the recorded data Xj have no relation to each other, the recorded data Xi and the recorded data Xj do not include common audio, as described earlier, and therefore the cross-correlation $Cij(\tau)$ does not assume a significant value. Incidentally, the time difference $\tau$ can assume a negative numerical value. Hence, for example, when the recorded data Xj is positioned in the rear of the recorded data Xi on the time axis, the time difference Oij is a positive number, and when the recorded data Xj is positioned in front of the recorded data Xi on the time axis, the time difference Oij is a negative number.

[Expression 1]

$$C_{ij}(\tau) = \frac{1}{N+1} \sum_{t=0}^{N} y_i(t) y_j(t+\tau) \quad (1)$$

In addition, as expressed by Equation (2), the cross-correlation $Cij(\tau)$ can also be calculated by an inverse Fourier transform (IFFT) of a cross spectrum of a frequency spectrum Yi(f) of the audio signal yi(t) and a frequency spectrum Yj(f) of the audio signal yj(t). f denotes frequency. Yi*(f) is a complex conjugate of Yi(f). A configuration that calculates the cross-correlation $Cij(\tau)$ by operation of Equation (2) has an advantage of being able to reduce an amount of calculation in calculating the cross-correlation $Cij(\tau)$ as compared with a configuration that calculates Equation (1).

[Expression 2]

$$C_{ij}(\tau) = IFFT(Y_i^*(f) Y_j(f)) \quad (2)$$

Figure 3:
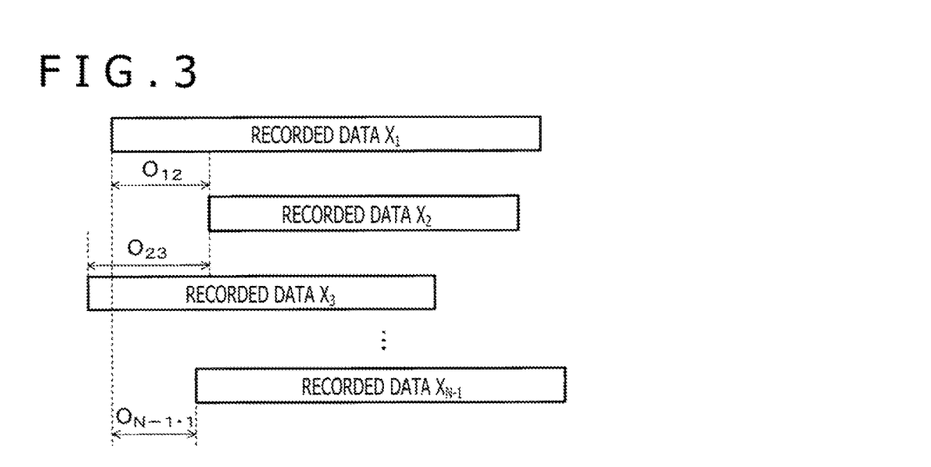
FIG. 3 is a view illustrating N pieces of recorded data including N−1 pieces of recorded data having relation to each other and one piece of recorded data having relation to the N−1 pieces of recorded data.

FIG. 3 is a view illustrating the N−1 pieces of recorded data X1 to XN−1 having relation to each other. As illustrated in FIG. 2, when the N−1 pieces of recorded data X1 to XN−1 have relation to each other, a total value S (S=O12+O23+ . . . +ON−1·1) of N−1 time differences O12 to ON−1·1 calculated for the N−1 recorded data pairs P12 to PN−1·1, respectively, is a numerical value close to zero (is ideally zero).

Figure 4:
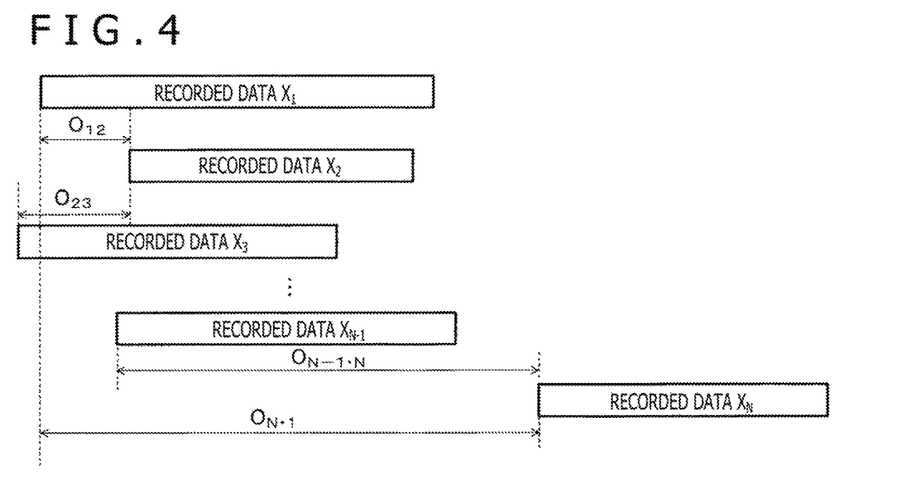
FIG. 4 is a view illustrating N pieces of recorded data including N−1 pieces of recorded data having relation to each other and one piece of recorded data having no relation to the N−1 pieces of recorded data.

Here, a case is assumed in which the N pieces of recorded data X1 to XN are provided by adding, to the N−1 pieces of recorded data X1 to XN−1 having relation to each other, one piece of recorded data XN having unknown relation thereto (which recorded data will hereinafter be referred to as "unknown recorded data"). When the unknown recorded data XN has relation to the recorded data X1 to XN−1, as illustrated in FIG. 2, the total value S (S=O12+O23+ . . . +ON·1) of time differences O12 to ON·1 calculated for the N recorded data pairs P12 to PN·1, respectively, is a numerical value close to zero (is ideally zero). When the unknown recorded data XN has no relation to the recorded data X1 to XN−1, on the other hand, as illustrated in FIG. 4, the recorded data XN−1 and the unknown recorded data XN do not partly overlap each other on the time axis (that is, the recorded data XN−1 and the unknown recorded data XN have no relation to each other), and therefore the cross-correlation CN−1·N($\tau$) of the recorded data pair PN−1·N is not a significant value. Hence, the total value S of the N time differences O12 to ON·1 is a numerical value deviating from zero. As is understood from the above description, the total value S of the time differences O12 to ON·1 can be used as an index indicating whether or not the recorded data XN having no relation is included in the N pieces of recorded data X1 to XN (whether or not the unknown recorded data X has relation to the recorded data X1 to XN−1). That is, when the total value S of the N time differences O12 to ON·1 deviates from zero, it can be estimated that the N pieces of recorded data X1 to XN include the recorded data XN having no relation.

In consideration of the above tendency, the evaluating unit 44 in FIG. 1 evaluates whether or not the N pieces of recorded data X1 to XN include the recorded data XN having no relation according to the total value S of the N time differences O12 to ON·1 calculated for the N recorded data pairs P12 to PN·1, respectively. In the first embodiment, as described earlier, the N pieces of recorded data X1 to XN include the N−1 pieces of recorded data X1 to XN−1 having relation to each other and the one piece of unknown recorded data XN having unknown relation to the N−1 pieces of recorded data X1 to XN−1. Under the above assumption, when the N pieces of recorded data X1 to XN include the recorded data XN having no relation, it means that the unknown recorded data XN has no relation to the other N−1 pieces of recorded data X1 to XN−1. Incidentally, while the unknown recorded data XN is added to an end of the arrangement of the N−1 pieces of recorded data X1 to XN−1 in the first embodiment, the position at which the unknown recorded data XN is added is arbitrary.

When the total value S of the time differences O12 to ON·1 calculated for the N recorded data pairs P12 to PN·1, respectively, exceeds a predetermined threshold value, the evaluating unit 44 in the first embodiment determines that the unknown recorded data XN is the recorded data XN having no relation to the N−1 pieces of recorded data X1 to XN−1, and excludes the unknown recorded data XN from the N pieces of recorded data X1 to XN. When the total value S of the N time differences O12 to ON·1 calculated for the N recorded data pairs P12 to PN·1, respectively, is less than the predetermined threshold value, on the other hand, the evaluating unit 44 in the first embodiment determines that the unknown recorded data XN is the recorded data XN having relation to the N−1 pieces of recorded data X1 to XN−1, and does not exclude the unknown recorded data XN from the N pieces of recorded data X1 to XN. Incidentally, the threshold value is selected empirically or statistically.

When the evaluating unit 44 determines that the unknown recorded data XN has no relation to the N−1 pieces of recorded data X1 to XN−1, the edit processing unit 46 in FIG. 1 generates content Z in which the N−1 pieces of recorded data X1 to XN−1 are synchronized with each other. When the evaluating unit 44 determines that the unknown recorded data XN has relation to the N−1 pieces of recorded data X1 to XN−1, on the other hand, the edit processing unit 46 generates content Z in which the N pieces of recorded data X1 to XN are synchronized with each other. The synchronization of the recorded data X means a state in which the time axes of audio and moving images of the respective pieces of recorded data X are made to coincide with each other in the plurality of pieces of recorded data X. Incidentally, while a publicly known technology can be arbitrarily adopted for the synchronization of the recorded data X, it is also possible to synchronize the plurality of pieces of recorded data X by using the time differences Oij calculated by the calculating unit 42. The content Z generated by the edit processing unit 46 in FIG. 1 are reproduced according to an instruction of the electronic controller 22. Specifically, the moving image of the content Z is displayed by the display device 32, and the audio of the content Z is emitted by the audio emitting device 34.

Incidentally, according to a configuration that synchronizes the N pieces of recorded data X1 to XN without excluding the recorded data XN having no relation to the N−1 pieces of recorded data X1 to XN−1, the relation on the time axis of the recorded data XN that is not supposed to be synchronized is estimated erroneously. In the first embodiment, the recorded data XN having no relation to the N−1 pieces of recorded data X1 to XN−1 is excluded, and therefore only the pieces of recorded data X having relation to each other can be synchronized with each other.

Incidentally, also assumed as a method of excluding the recorded data XN having no relation to the N−1 pieces of recorded data X1 to XN−1 from the N pieces of recorded data X1 to XN is a configuration (hereinafter referred to as a "contrast example") that, for example, refers to information indicating the recording periods (for example, start times and end times) of the recorded data X, and excludes the recorded data XN having no relation in terms of time to the N−1 pieces of recorded data X1 to XN−1. However, in the contrast example, the recorded data XN having relation in terms of time as a result of being recorded in a same period but having no relation in terms of content is erroneously decided to have relation to the N−1 pieces of recorded data X1 to XN−1, and is consequently not excluded. On the other hand, the first embodiment can determines that the recorded data XN has no relation to the N−1 pieces of recorded data X1 to XN−1 according to the total value S of the time differences Oij, and can therefore appropriately exclude the recorded data XN having relation in terms of time but having no relation in terms of content. In addition, there is an advantage of being able to evaluate recorded data X having no information indicating a recording period.

Figure 5:
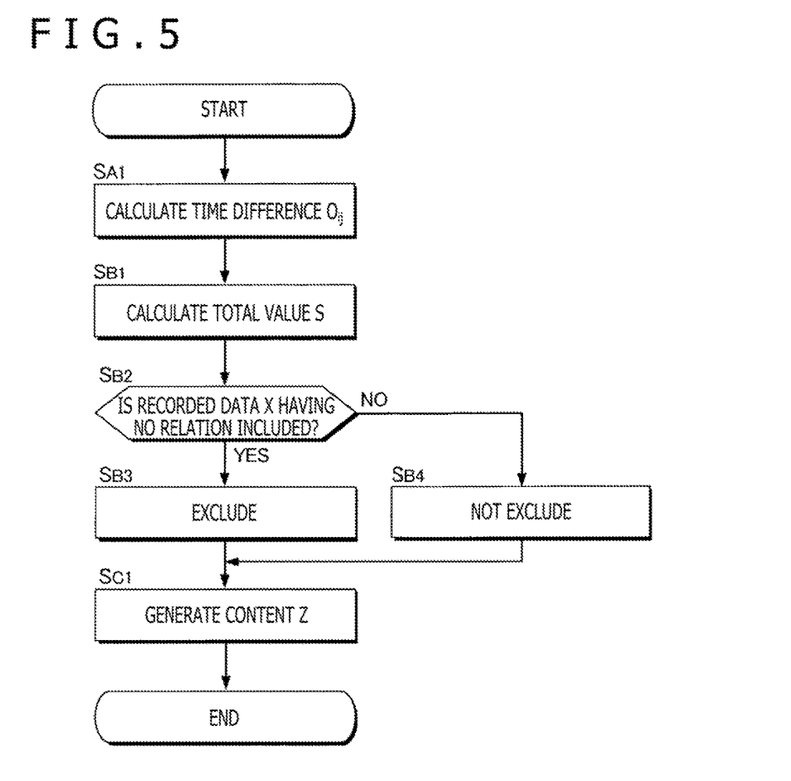
FIG. 5 is a flowchart of a process for generating content by an electronic controller.

FIG. 5 is a flowchart of a process for generating content Z by the electronic controller 22 generates content Z. The processing of FIG. 5 is started by being triggered by an instruction from a user to the operating device 36. As an example, a case is assumed in which the recorded data obtaining device 26 obtains N pieces of recorded data X1 to XN including N−1 pieces of recorded data X1 to XN−1 having relation to each other, the N−1 pieces of recorded data X1 to XN−1 having been obtained by recording a state of a play performed on a stage from mutually different positions, and one piece of unknown recorded data X having unknown relation to the N−1 pieces of recorded data X1 to XN−1. When the processing of FIG. 5 is started, the calculating unit 42 calculates, for each of N recorded data pairs PP12 to PN·1, a time difference τ maximizing the absolute value |Cij(τ)| of the cross-correlation Cij(τ) as a time difference Oij (O12 to ON·1) between the audio signal yi(t) and the audio signal yj(t) of the recorded data pair Pij (SA1).

The evaluating unit 44 calculates a total value S of the N time differences O12 to ON·1 calculated for the N recorded data pairs P12 to PN·1, respectively (SB1). Next, the evaluating unit 44 evaluates whether or not the N pieces of recorded data X1 to XN include the recorded data XN having no relation by comparing the total value S and a threshold value with each other (SB2). Specifically, when the total value S of the N time differences O12 to ON·1 calculated for the N recorded data pairs P12 to PN·1, respectively, exceeds a predetermined threshold value, the evaluating unit 44 determines that the unknown recorded data X is the recorded data XN having no relation to the N−1 pieces of recorded data X1 to XN−1 (SB2: YES), and excludes the unknown recorded data X from the N pieces of recorded data X1 to XN (SB3). When the total value S of the N time differences O12 to ON·1 calculated for the N recorded data pairs P12 to PN·1, respectively, is less than the predetermined threshold value, on the other hand, the evaluating unit 44 determines that the unknown recorded data X has relation to the N−1 pieces of recorded data X1 to XN−1 (SB2: NO), and does not exclude the unknown recorded data X from the N pieces of recorded data X1 to XN (SB4).

The edit processing unit 46 generates content Z on the basis of a result of the processing by the evaluating unit 44 (SC1). Specifically, when the evaluating unit 44 excludes the recorded data XN having no relation (SB3), the edit processing unit 46 generates the content Z in which the N−1 pieces of recorded data X1 to XN−1 are synchronized with each other. When the evaluating unit 44 does not exclude the unknown recorded data XN from the N pieces of recorded data X1 to XN (SB4), the edit processing unit 46 generates the content Z in which the N pieces of recorded data X1 to XN including the unknown recorded data XN are synchronized with each other. As described above, the calculating unit 42 performs the processing (step SA1) of calculating the N time differences O12 to ON·1 of the N recorded data pairs P12 to PN·1, and the evaluating unit 44 performs the processing (steps SB1 to SB4) of evaluating whether or not the N pieces of recorded data X1 to XN include the recorded data XN having no relation.

As is understood from the above description, the first embodiment can appropriately evaluate whether or not the N pieces of recorded data X1 to XN include the recorded data XN having no relation according to the total value S of the N time differences O12 to ON·1 respectively calculated for the N recorded data pairs P12 to PN·1 when the N pieces of recorded data X1 to XN are arranged cyclically.

Merely evaluating the presence or absence of recorded data X having no relation according to the total value S of the N time differences O12 to ON·1 respectively calculated for N pieces of recorded data X1 to XN that are unknown as to whether or not there is relation therebetween cannot identify recorded data X having no relation to the other recorded data X among the N pieces of recorded data X. The first embodiment evaluates the presence or absence of relation according to the total value S of the N time differences O12 to ON·1 of the N recorded data pairs P12 to PN·1, particularly for the N pieces of recorded data X1 to XN including the N−1 pieces of recorded data X1 to XN−1 already known to have relation to each other and one piece of recorded data X having unknown relation to the N−1 pieces of recorded data X1 to XN−1. The first embodiment can therefore determine whether or not the one piece of recorded data XN has relation to the N−1 pieces of recorded data X1 to XN−1.

Second Embodiment

The second embodiment will be described. In each of the embodiments illustrated in the following, elements that have the same actions or functions as in the first embodiment have been assigned the same reference symbols as those used to describe the first embodiment, and the detailed descriptions thereof have been appropriately omitted.

Whereas the first embodiment evaluates whether or not one piece of unknown recorded data X has relation to the other recorded data X, the second embodiment evaluates whether or not each of a plurality of pieces of recorded data X has relation to other recorded data X.

Figure 6:
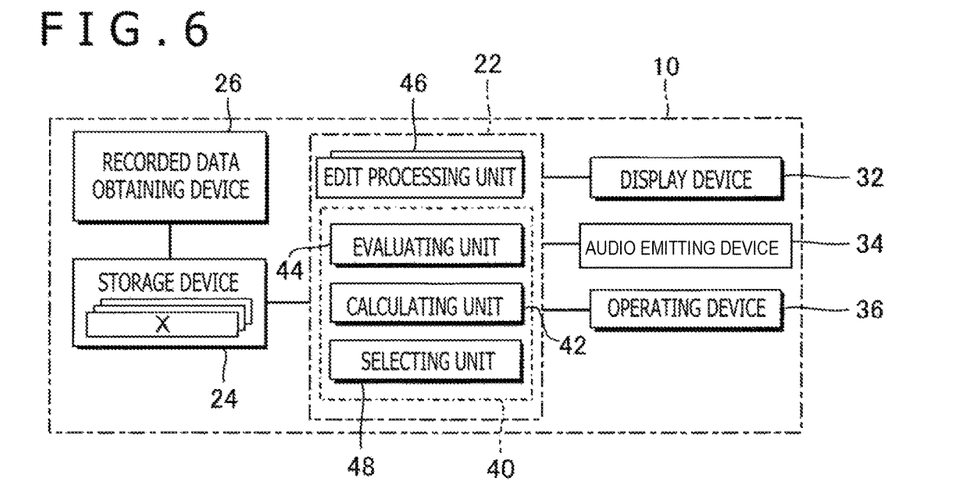
FIG. 6 is a block diagram of a recorded data editing system according to a second embodiment.

FIG. 6 is a block diagram of a recorded data editing system 10 according to the second embodiment. Whereas the storage device 24 in the first embodiment stores N−1 pieces of recorded data X1 to XN−1 having relation to each other and one piece of unknown recorded data XN, a storage device 24 in the second embodiment stores a plurality of pieces of recorded data X related to each other and a plurality of pieces of unknown recorded data X having unknown relation to the other recorded data X.

Figure 7:
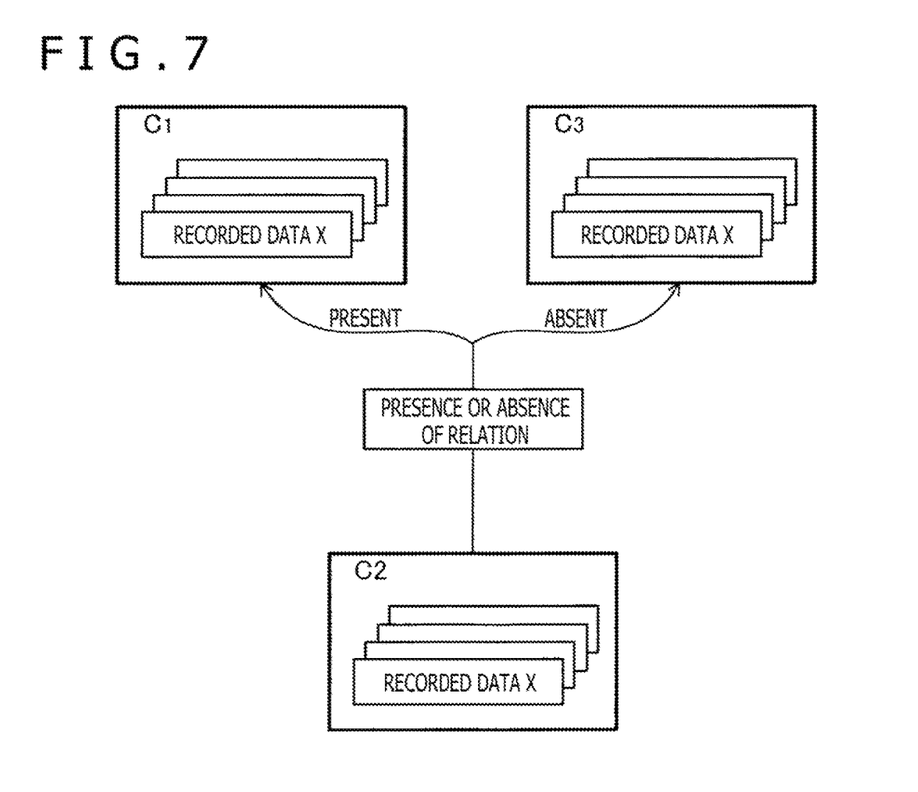
FIG. 7 is a view illustrating of processing of moving evaluation target recorded data in an evaluating unit.

As illustrated in FIG. 7, processing of a recorded data analyzing unit 40 in the second embodiment assumes, for convenience, a set of a plurality of pieces of recorded data X already known to have relation to each other (which set will hereinafter be referred to as a "related data group") C1, a set of a plurality of pieces of unknown recorded data X that are unknown as to whether or not the plurality of pieces of unknown recorded data X have relation to the recorded data X within the related data group C1 (which set will hereinafter be referred to as an "unknown data group") C2, and a set of recorded data X whose relation to the recorded data X in the related data group C1 is negated (which set will hereinafter be referred to as an "unrelated data group") C3 among the plurality of pieces of unknown recorded data X in the unknown data group C2. As illustrated in FIG. 6, the recorded data analyzing unit 40 in the second embodiment has a configuration obtained by adding a selecting unit 48 to a calculating unit 42 and an evaluating unit 44 similar to those of the first embodiment. The recorded data analyzing unit 40 in the second embodiment evaluates presence or absence of relation of each of the plurality of pieces of unknown recorded data X included in the unknown data group C2 to the plurality of pieces of recorded data X in the related data group C1.

The selecting unit 48 in FIG. 6 sequentially selects one piece of unknown recorded data X as evaluation target recorded data XN from the unknown data group C2. As in the first embodiment, the calculating unit 42 in the second embodiment calculates a time difference Oij for each recorded data pair Pij of N pieces of recorded data X1 to XN including the one piece of evaluation target recorded data XN selected by the selecting unit 48 and the plurality (N−1) of pieces of recorded data X1 to XN−1 within the related data group C1. The evaluating unit 44 in the second embodiment evaluates, as in the first embodiment, presence or absence of relation of the evaluation target recorded data XN to each of the pieces of recorded data X within the related data group C1 (whether or not the recorded data XN having no relation is included in the N pieces of recorded data X1 to XN) according to a total value S of N time differences O12 to ON·1. As illustrated in FIG. 7, when the relation of the evaluation target recorded data XN is affirmed, the evaluating unit 44 in the second embodiment moves the evaluation target recorded data XN from the unknown data group C2 to the related data group C1. When the relation of the evaluation target recorded data XN is negated, on the other hand, the evaluating unit 44 in the second embodiment moves the evaluation target recorded data XN from the unknown data group C2 to the unrelated data group C3. The processing in the recorded data analyzing unit 40 (the selecting unit 48, the calculating unit 42, and the evaluating unit 44) is repeated until the unknown data group C2 is cleared of the recorded data X, that is, until the unknown data group C2 becomes empty. After the processing in the recorded data analyzing unit 40 is completed, an edit processing unit 46 in the second embodiment generates, as in the first embodiment, content Z in which the plurality of pieces of recorded data X included in the related data group C1 are synchronized with each other.

Figure 8:
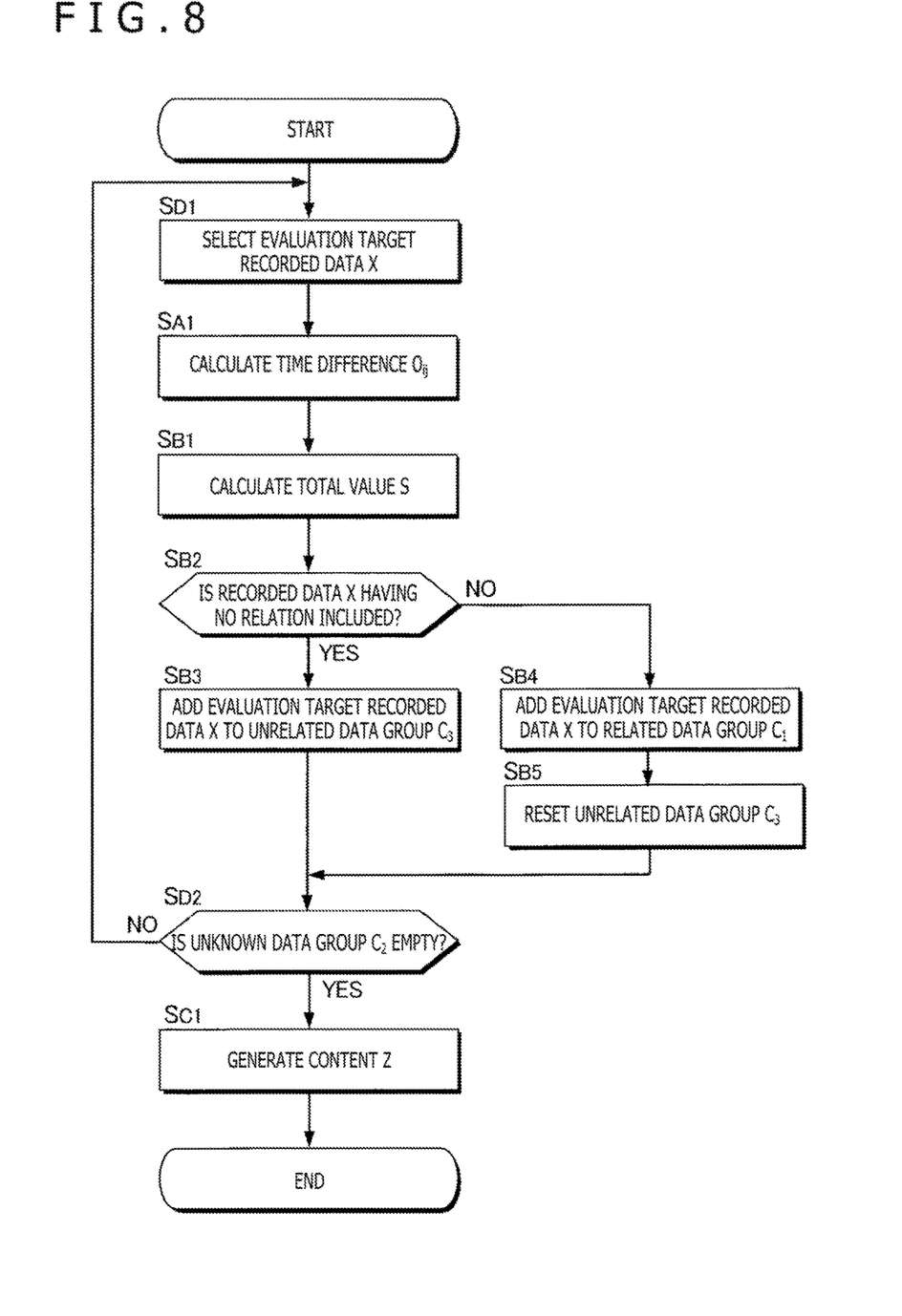
FIG. 8 is a flowchart of a process for generating content by an electronic controller.

FIG. 8 is a flowchart of a process for generating content Z by the electronic controller 22 in the second embodiment. As in the first embodiment, the processing of FIG. 8 is started by being triggered by an instruction from a user to an operating device 36. When the processing of FIG. 8 is started, the selecting unit 48 selects one piece of evaluation target recorded data XN from the unknown data group C2 (SD1). The calculating unit 42 calculates a time difference Oij for each recorded data pair Pij of the N pieces of recorded data X1 to XN including the one piece of evaluation target recorded data XN selected by the selecting unit 48 and the plurality (N−1) of pieces of recorded data X1 to XN−1 within the related data group C1 (SA1). The evaluating unit 44 calculates a total value S of N time differences O12 to ON·1 calculated for N recorded data pairs P12 to PN·1, respectively (SB1). Next, the evaluating unit 44 evaluates whether or not the N pieces of recorded data X1 to XN include the recorded data XN having no relation by comparing the total value S and a threshold value with each other (SB2). Specifically, when the total value S of the N time differences O12 to ON·1 calculated for the N recorded data pairs P12 to PN·1, respectively, exceeds a predetermined threshold value, the evaluating unit 44 determines that the evaluation target recorded data XN is the recorded data XN having no relation to the related data group C1 (SB2: YES), and moves the evaluation target recorded data XN from the unknown data group C2 to the unrelated data group C3 (SB3). When the total value S of the N time differences O12 to ON·1 calculated for the N recorded data pairs P12 to PN·1, respectively, is less than the predetermined threshold value, on the other hand, the evaluating unit 44 determines that the evaluation target recorded data XN is the recorded data XN having relation to the related data group C1 (SB2: NO), and moves the evaluation target recorded data XN from the unknown data group C2 to the related data group C1 (SB4). Hence, a total number of pieces of recorded data X in the related data group C1 is increased by one. Then, when the evaluating unit 44 moves the evaluation target recorded data XN to the related data group C1 (that is, when the relation of the evaluation target recorded data XN to the related data group C1 is affirmed), the evaluating unit 44 moves all of the recorded data X included in the unrelated data group C3 to the unknown data group C2 (SB5). That is, the unrelated data group C3 is initialized.

Figure 9:
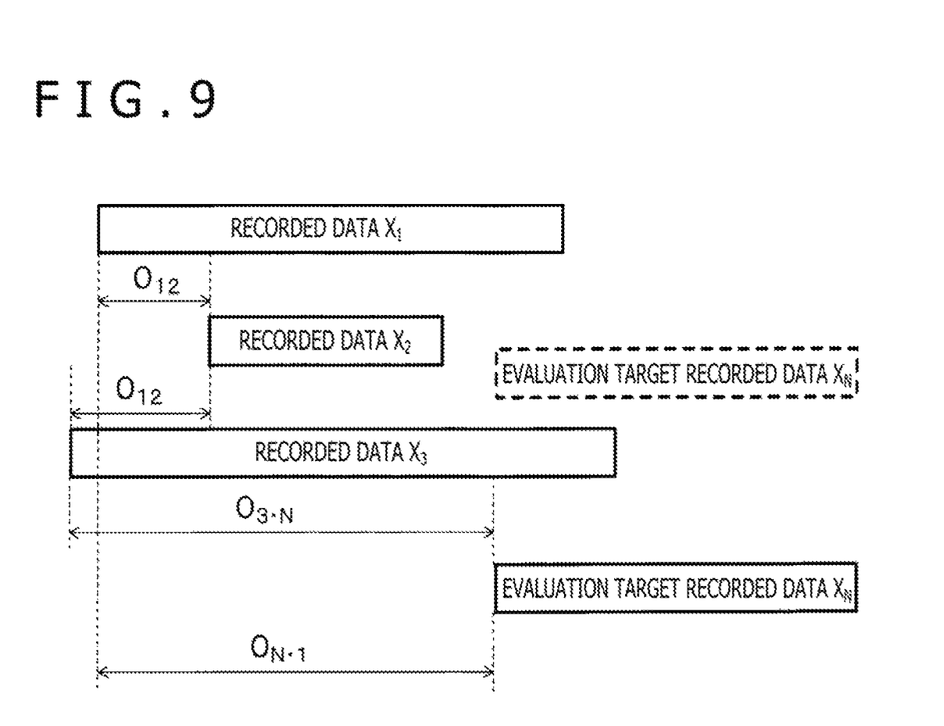
FIG. 9 is a view illustrating a case where the relation of recorded data included in an unrelated data group is affirmed by reevaluation.

Here, in a case where one piece of evaluation target recorded data XN is moved from the unknown data group C2 to the related data group C1, when the presence or absence of relation of recorded data X within the unrelated data group C3 whose relation is negated in evaluation in the past is evaluated again, the relation may be affirmed. For example, as illustrated in FIG. 9, when relation is evaluated between three pieces of recorded data X, that is, recorded data X1 and recorded data X2 included in the related data group C1 and evaluation target recorded data XN (broken line), the evaluation target recorded data XN does not partly overlap the recorded data X2 on the time axis, and therefore the evaluation target recorded data XN is decided to have no relation to the related data group C1 (recorded data X1 and X2) and is added to the unrelated data group C3. However, when the evaluating unit 44 adds recorded data X3 to the related data group C1, the evaluation target recorded data XN (solid line) included in the unrelated data group C3 partly overlaps the recorded data X3 on the time axis, as illustrated in FIG. 9. Thus, when the evaluating unit 44 performs evaluation again, the relation of the evaluation target recorded data XN to the related data group C1 (recorded data X1 to X3) is affirmed. Accordingly, when the evaluating unit 44 moves the evaluation target recorded data XN from the unknown data group C2 to the related data group C1 (SB4), the evaluating unit 44 moves all of the recorded data X included in the unrelated data group C3 to the unknown data group C2 (SB5), as described above, and the evaluating unit 44 performs reevaluation.

After the evaluating unit 44 moves the evaluation target recorded data XN (SB3 and SB4), the selecting unit 48 determines whether or not there is recorded data X in the unknown data group C2, that is, whether or not the unknown data group C2 is empty (SD2). When the unknown data group C2 is empty (SD2: YES), the edit processing unit 46 generates content Z in which the plurality of pieces of recorded data X included in the related data group C1 are synchronized with each other (SC1). When the unknown data group C2 is not empty (SD2: NO), on the other hand, the recorded data analyzing unit 40 repeats the processing of steps SD1 to SB2 for each piece of unknown recorded data X within the unknown data group C2. As described above, the selecting unit 48 performs the processing (SD1 and SD2) of selecting evaluation target recorded data XN from the unknown data group C2, the calculating unit 42 performs the processing (SA1) of calculating the N time differences O12 to ON·1 calculated for the N recorded data pairs P12 to PN·1, respectively, and the evaluating unit 44 performs the processing (SB1 to SB5) of evaluating whether or not the N pieces of recorded data X1 to XN include the recorded data XN having no relation. The recorded data analyzing unit 40 (the selecting unit 48, the calculating unit 42, and the evaluating unit 44) in the second embodiment can be said to perform processing of excluding the recorded data XN having no relation to the related data group C1 from the unknown data group C2.

The second embodiment also achieves effects similar to those of the first embodiment. The second embodiment can particularly classify a plurality of pieces of recorded data X unknown as to presence or absence of relation thereof into the related data group C1 and the unrelated data group C3. In addition, in the second embodiment, each time the evaluation target recorded data XN is moved to the related data group C1, the recorded data X in the unrelated data group C3 is moved to the unknown data group C2. Hence, even recorded data X once moved to the unrelated data group C3 can be sorted into the related data group C1 anew when the recorded data X has relation to recorded data X newly moved to the related data group C1. That is, all of a plurality of pieces of recorded data X having relation can be sorted into the related data group C1.

<Modifications>

Each of the embodiments illustrated above can be modified in various manners. Modifications will be illustrated in the following. Two or more modifications arbitrarily selected from the following illustrations can be integrated with each other as appropriate within a scope where no mutual inconsistency arises.

(1) In each of the foregoing embodiments, the time difference Oij is calculated according to the time difference τ between the audio signals y(t) included in the respective pieces of recorded data Xi and Xj of the recorded data pair Pij. However, the signals used for the calculation of the time difference τ are not limited to the audio signals y(t). For example, when the audio of each of the pieces of recorded data X includes common utterance contents, the time difference Oij can also be calculated by analyzing the utterance contents of the respective pieces of recorded data Xi and Xj by voice recognition, and comparing a result of the analysis between the two pieces of recorded data Xi and Xj. In addition, the time difference Oij may be calculated by comparing (for example, calculating the cross-correlation Cij(τ)), between the two pieces of recorded data Xi and Xj, signals indicating temporal changes in a feature quantity (for example, pitch) extracted from the audio signals y(t). Further, the time difference Oij can also be calculated by generating signals indicating temporal changes in lightness of images included in the recorded data pair Pij, for example, from moving image signals representing temporal changes in the images (that is, moving images), and comparing the signals between the two pieces of recorded data Xi and Xj. That is, the time difference τ can also be calculated by using signals of some kind which signals are generated from signals (audio signals and moving image signals) representing temporal changes of the recording target. As is understood from the above description, the signals used to calculate the time difference Oij are comprehensively expressed as time signals representing temporal changes of the recording target (audio or a moving image) in the respective two pieces of recorded data Xi and Xj of the recorded data pair Pij. That is, the concept of the time signals includes not only signals (audio signals and moving image signals) representing temporal changes of the recording target itself but also signals representing temporal changes in feature quantities of the recording target (signals indirectly representing temporal changes of the recording target). However, in consideration of a tendency for the audio signals y(t) to have small differences in temporal variation according to a recording condition (for example, photographing positions), the configuration of each of the foregoing embodiments using the audio signals y(t) has an advantage of being able to identify the time differences O12 to ON·1 between the N pieces of recorded data X1 to XN with high accuracy as compared with a configuration using time signals such as moving images or the like.

(2) In each of the foregoing embodiments, the time difference Oij of the recorded data pair Pij is calculated according to the cross-correlation Cij(τ). However, the index used for the calculation of the time difference Oij is not limited to the cross-correlation Cij(τ). For example, the time difference Oij of the recorded data pair Pij can also be calculated according to a normalized cross-correlation. The index used for the calculation of the time difference Oij is arbitrary as long as the time difference Oij can be calculated between time signals representing temporal changes of the recording target in the two respective pieces of recorded data Xi and Xj of the recorded data pair Pij.

(3) In each of the foregoing embodiments, the time difference τ maximizing the absolute value |Cij(τ)| of the cross-correlation Cij(τ) is determined as the time difference Oij. However, the time difference Oij can also be selected from a plurality of candidate values identified from the absolute value |Cij(τ)| of the cross-correlation Cij(τ). For example, the calculating unit 42 identifies a plurality of time differences τ corresponding to mutually different maxima of the absolute value |Cij(τ)| of the cross-correlation Cij(τ) (for example, maxima of a moving average of the absolute value |Cij(τ)|) as candidates for the time difference Oij, and calculates one of the plurality of candidate values as the time difference Oij. For example, a candidate value minimizing the absolute value of the total value S among the plurality of candidate values is selected as the time difference Oij. The above configuration can identify the time difference Oij with high accuracy.

(4) In each of the foregoing embodiments, the evaluating unit 44 evaluates whether or not the recorded data XN having no relation is included in the N pieces of recorded data X1 to XN including the N−1 pieces of recorded data X1 to XN−1 having relation to each other and one piece of unknown recorded data XN having unknown relation. However, the presence or absence of relation can also be evaluated according to the total value S of the N time differences O12 to ON·1 for the N pieces of recorded data X1 to XN including a plurality of pieces of recorded data X having relation to each other and a plurality of pieces of unknown recorded data X. That is, there may be a plurality of pieces of unknown recorded data X.

(5) In each of the foregoing embodiments, the edit processing unit 46 is incorporated in the recorded data editing system 10. However, the edit processing unit 46 can also be incorporated in a server device or a terminal device separate from the recorded data editing system 10. In this case, the recorded data editing system 10 transmits a plurality of pieces of recorded data X related to each other to the server device or the terminal device. As is understood from the above description, the recorded data editing system 10 in each of the foregoing embodiments is an illustration of a device (that is, a recorded data processing device) including the recorded data analyzing unit 40 that excludes the recorded data XN having no relation to the N−1 pieces of recorded data X1 to XN−1 having relation to each other by analyzing the time differences O12 to ON·1 for the N pieces of recorded data X1 to XN. Edit processing (the edit processing unit 46) is not essential in the recorded data processing device according to the some embodiments.

(6) In the second embodiment, the presence or absence of relation of all of the plurality of pieces of unknown recorded data X stored by the storage device 24 is evaluated. However, it is also possible to evaluate the presence or absence of relation of a part of the unknown recorded data X stored by the storage device 24. For example, the recorded data analyzing unit 40 obtains time information indicating a recording period (for example, a start time and an end time) of each piece of recorded data X from the storage device 24 together with the unknown recorded data X, identifies the unknown recorded data X whose recording time indicated by the time information overlaps those of the N−1 pieces of recorded data X on the time axis, and performs operation similar to that of the second embodiment. That is, the unknown recorded data X that clearly has no relation to the N−1 pieces of recorded data X is excluded from processing targets. Incidentally, while the presence or absence of relation between the unknown recorded data X and the N−1 pieces of recorded data X can be evaluated from the time information, times measured by the recording devices can actually have errors in the respective recording devices. There is thus a meaning in evaluating the presence or absence of relation of the unknown recorded data X by the configuration of the second embodiment. The above configuration can exclude the unknown recorded data X having no relation to the N−1 pieces of recorded data X from processing targets, and therefore reduce a processing load on the recorded data analyzing unit 40 as compared with the configuration that sets all of the unknown recorded data X stored by the storage device 24 as processing targets.

(7) The recorded data analyzing unit 40 illustrated in each of the foregoing embodiments is implemented by cooperation between the electronic controller 22 and a program, as described above. The program can be provided in a form of being stored on a recording medium readable by a computer, and installed on the computer. The recording medium is, for example, a non-transitory recording medium. An optical recording medium (optical disk) such as a compact disc read-only memory (CD-ROM) or the like is a good example of the recording medium. However, the recording medium can include publicly known arbitrary types of recording media such as a semiconductor recording medium, a magnetic recording medium, and the like. It is to be noted that the non-transitory recording medium includes arbitrary recording media excluding transitory propagating signals, and does not exclude volatile recording media. In addition, the program can also be provided to a computer in a form of distribution via a communication network.

(8) In some embodiments can also be identified as an operating method (recorded data processing method) of the recorded data analyzing unit 40 according to each of the foregoing embodiments. Specifically, in a recorded data processing method according to a first mode of the present invention, for each of N (N is a natural number of three or more) recorded data pairs P12 to PN·1 each formed by two pieces of recorded data Xi and Xj that are adjacent to each other when N pieces of recorded data X each representing a recording target including at least one of audio or video are cyclically arranged, a time difference Oij is calculated between time signals representing temporal changes of the recording target in the two respective pieces of recorded data Xi and Xj of the recorded data pair Pij, and whether or not the N pieces of recorded data X1 to XN include recorded data XN having no relation is evaluated according to a total value S of time differences Oij calculated for the N recorded data pairs P12 to PN·1, individually.

In addition, in a recorded data processing method according to a second mode of the present invention, evaluation target recorded data XN is sequentially selected from an unknown data group C2 including a plurality of pieces of recorded data X each representing a recording target including at least one of audio or an image, at each time of selection of the evaluation target recorded data XN, for each of N (N is a natural number of three or more) recorded data pairs P12 to PN·1 each formed by two pieces of recorded data Xi and Xj that are adjacent to each other when N pieces of recorded data X are cyclically arranged, the N pieces of recorded data X including a related data group C1 including a plurality of pieces of recorded data X each representing the recording target including the at least one of the audio or the image and having relation to each other and the evaluation target recorded data XN, a time difference Oij is calculated between time signals representing temporal changes of the recording target in the two respective pieces of recorded data Xi and Xj of the recorded data pair Pij, and presence or absence of relation of the evaluation target recorded data XN to the related data group C1 is evaluated according to a total value S of time differences Oij calculated for the N recorded data pairs P12 to PN·1, individually, and when the relation is affirmed, the evaluation target recorded data XN is moved from the unknown data group C2 to the related data group C1.

(9) The following constitutions, for example, are grasped from the embodiments illustrated above.

A recorded data processing method according to one aspect includes: calculating, for each of N (N is a natural number of three or more) recorded data pairs each formed by two pieces of recorded data that are adjacent to each other when N pieces of recorded data each representing a recording target including at least one of audio or an video are arranged cyclically, a time difference between time signals representing temporal changes of the recording target in the two respective pieces of recorded data of the recorded data pair; and evaluating whether or not the N pieces of recorded data include recorded data having no relation according to a total value of N time differences calculated for the N recorded data pairs, individually. The above method can appropriately evaluate whether or not the N pieces of recorded data include recorded data having no relation according to the total value of the N time differences individually calculated for the N recorded data pairs when the N pieces of recorded data each representing the recording target including the at least one of the audio or video are arranged cyclically.

In the recorded data processing method according to another aspect, in the calculating of the time difference, the time difference is calculated for each recorded data pair of the N pieces of recorded data including N−1 pieces of recorded data having relation to each other and one piece of recorded data having unknown relation to the N−1 pieces of recorded data, and in the evaluating, when the N pieces of recorded data are evaluated as including recorded data having no relation, the one piece of recorded data is decided to be recorded data having no relation to the N−1 pieces of recorded data. In the above method, when the N pieces of recorded data are evaluated as including recorded data having no relation, the recorded data having no relation to the N−1 pieces of recorded data is identified. Merely evaluating the presence or absence of recorded data having no relation according to a total value of time differences of N pieces of recorded data that are unknown as to whether or not there is relation there between cannot identify recorded data having no relation to the other recorded data among the N pieces of recorded data. The above-described preferred method evaluates the presence or absence of relation according to the total value of the time differences of the respective recorded data pairs of the N pieces of recorded data including the N−1 pieces of recorded data already known to have relation to each other and one piece of recorded data having unknown relation to the N−1 pieces of recorded data. It is therefore possible to determine whether or not the one piece of recorded data has relation to the N−1 pieces of recorded data.

In the recorded data processing method according to another aspect, content in which a plurality of pieces of recorded data having the relation among the N pieces of recorded data are synchronized with each other are generated. The above method can generate the content in which the plurality of pieces of recorded data having relation to each other among the N pieces of recorded data are synchronized with each other.

A recorded data processing method according to another aspect includes: sequentially selecting evaluation target recorded data from an unknown data group including a plurality of pieces of recorded data each representing a recording target including at least one of audio or video; at each time of selection of the evaluation target recorded data, for each of N (N is a natural number of three or more) recorded data pairs each formed by two pieces of recorded data that are adjacent to each other when N pieces of recorded data are arranged cyclically, the N pieces of recorded data including a related data group including a plurality of pieces of recorded data each representing the recording target including the at least one of the audio or the image and having relation to each other and the evaluation target recorded data, calculating a time difference between time signals representing temporal changes of the recording target in the two respective pieces of recorded data of the recorded data pair; and evaluating presence or absence of relation of the evaluation target recorded data to the related data group according to a total value of N time differences calculated for the N recorded data pairs, individually, and moving the evaluation target recorded data from the unknown data group to the related data group when the relation is affirmed. The above method evaluates, for each (evaluation target recorded data) of the plurality of pieces of recorded data unknown as to the presence or absence of the relation, the presence or absence of relation thereof to the plurality of pieces of recorded data already known to have relation to each other, and adds the evaluation target recorded data evaluated as having the relation to the related data group. Hence, it is possible to classify the plurality of pieces of recorded data unknown as to the presence or absence of relation thereof into a set of the plurality of pieces of recorded data already known to have relation to each other (related data group) and a set of recorded data having no relation.

In the recorded data processing method according to another aspect, content in which the plurality of pieces of recorded data included in the related data group are synchronized with each other are generated. The above method can generate the content in which the plurality of pieces of recorded data having relation to each other are synchronized with each other.

In the recorded data processing method according to another aspect, in the evaluating of the presence or absence of the relation, recorded data whose relation to the related data group is negated is moved from the unknown data group to an unrelated data group, and each time the evaluation target recorded data is moved to the related data group, recorded data included in the unrelated data group is moved to the unknown data group. The above method moves the recorded data in the unrelated data group to the unknown data group each time the evaluation target recorded data is moved to the related data group. Thus, even recorded data once moved to the unrelated data group can be included in the related data group anew when the recorded data has relation to recorded data newly moved to the related data group. Hence, all of a plurality of pieces of recorded data having relation to each other can be sorted into the related data group.

In the recorded data processing method according to another aspect, the time signals are audio signals representing temporal changes in the audio. The above method calculates a total value of time differences between audio signals in the N recorded data pairs, individually. Hence, because time signals of movie or the like have large differences in temporal variation according to a recording condition (for example, capturing positions), but the audio signals have small differences in temporal variation according to the recording condition, it is possible to identify time differences between a plurality of pieces of recorded data with high accuracy, and more appropriately evaluate whether or not recorded data having no relation is included.

In the recorded data processing method according to another aspect, in the calculating of the time difference, a plurality of candidate values for the time difference between the time signals representing the temporal changes of the recording target in the two respective pieces of recorded data of the N recorded data pairs are identified, and one of the plurality of candidate values is identified as the time difference. The above method can identify the time difference with high accuracy as compared with the method of adopting the sole time difference identified from between the two pieces of recorded data as a final value.

A recorded data processing device according to another aspect includes an electronic controller that has a calculating unit and an evaluating unit, wherein the calculating unit is configured to calculate, for each of N (N is a natural number of three or more) recorded data pairs each formed by two pieces of recorded data that are adjacent to each other when N pieces of recorded data each representing a recording target including at least one of audio or video are arranged cyclically, a time difference between time signals representing temporal changes of the recording target in the two respective pieces of recorded data of the recorded data pair; and the evaluating unit is configured to evaluate whether or not the N pieces of recorded data include recorded data having no relation according to a total value of N time differences calculated for the N recorded data pairs, individually. The above configuration can appropriately evaluate whether or not the N pieces of recorded data include recorded data having no relation according to the total value of the N time differences individually calculated for the N recorded data pairs when the N pieces of recorded data each representing the recording target including the at least one of the audio or the image are arranged cyclically.

A recorded data processing device according to another aspect includes an electronic controller that has a selecting unit, a calculating unit and an evaluating unit, wherein the selecting unit is configured to sequentially select evaluation target recorded data from an unknown data group including a plurality of pieces of recorded data each representing a recording target including at least one of audio or video; a calculating unit is configured to calculate, at each time of selection of the evaluation target recorded data, for each of N (N is a natural number of three or more) recorded data pairs each formed by two pieces of recorded data that are adjacent to each other when N pieces of recorded data are arranged cyclically, the N pieces of recorded data including a related data group including a plurality of pieces of recorded data each representing the recording target including the at least one of the audio or the image and having relation to each other and the evaluation target recorded data, a time difference between time signals representing temporal changes of the recording target in the two respective pieces of recorded data of the recorded data pair; and the evaluating unit is configured to evaluate, at each time of selection of the evaluation target recorded data, presence or absence of relation of the evaluation target recorded data to the related data group according to a total value of N time differences calculated for the N recorded data pairs, individually, and add the evaluation target recorded data to the related data group when the relation is affirmed. According to the above configuration, it is possible to classify the plurality of pieces of recorded data unknown as to the presence or absence of relation thereof into a set of the plurality of pieces of recorded data already known to have relation to each other (related data group) and a set of recorded data having no relation.

The invention claimed is:

1. A recorded data processing method, comprising:
   calculating a time difference between time signals representing temporal changes of a recording target in two pieces of recorded data of each recorded data pair of N recorded data pairs, wherein
      N is greater than or equal to 3,
      each recorded data pair of the N recorded data pairs is formed by the two pieces of the recorded data that are adjacent to each other,
      the two pieces of the recorded data belongs to N pieces of the recorded data arranged cyclically, and
      the N pieces of the recorded data each represents the recording target including at least one of audio or video; and
   evaluating whether or not the recorded data includes one piece of the recorded data having no relevance in terms of one of content or time to other pieces of the recorded data among the N pieces of the recorded data, according to a total value of N time differences calculated for the N recorded data pairs, wherein
      the time difference is calculated for each recorded data pair of the N pieces of the recorded data including N−1 pieces of the recorded data having relation to each other and the one piece of the recorded data having unknown relation to the N−1 pieces of the recorded data, and
      when the recorded data is evaluated as including the one piece of the recorded data having no relevance among the N pieces of the recorded data, the one piece of the recorded data is determined to be recorded data having no relation to the N−1 pieces of the recorded data.

2. The recorded data processing method according to claim 1, wherein content in which a plurality of pieces of the recorded data having the relation among the N pieces of the recorded data are synchronized with each other is generated.

3. The recorded data processing method according to claim 1, wherein the time signals are audio signals representing the temporal changes in the audio.

4. The recorded data processing method according to claim 1, wherein
   in the calculating of the time difference, a plurality of candidate values for the time difference between the time signals representing the temporal changes of the recording target in the two pieces of the recorded data of the N recorded data pairs are respectively identified, and
   one of the plurality of candidate values is identified as the time difference.

5. A recorded data processing method, comprising:
   sequentially selecting evaluation target recorded data from an unknown data group including a plurality of pieces of recorded data each representing a recording target including at least one of audio or an image;
   at each time of selection of the evaluation target recorded data, for each of N recorded data pairs each formed by two pieces of recorded data that are adjacent to each other when N pieces of recorded data are arranged cyclically, the N pieces of recorded data including a related data group including the plurality of pieces of recorded data each representing the recording target including the at least one of the audio or the image and having relation to each other and the evaluation target recorded data, calculating a time difference between time signals representing temporal changes of the recording target in the two pieces of recorded data of each recorded data pair, wherein N is a natural number of three or more;

evaluating presence or absence of relation of the evaluation target recorded data to the related data group according to a total value of N time differences calculated for the N recorded data pairs, individually; and moving the evaluation target recorded data from the unknown data group to the related data group when the relation is affirmed.

6. The recorded data processing method according to claim 5, wherein content in which the plurality of pieces of recorded data included in the related data group are synchronized with each other is generated.

7. The recorded data processing method according to claim 5, wherein, in the evaluating of the presence or absence of the relation, first recorded data whose relation to the related data group is negated is moved from the unknown data group to an unrelated data group, and each time the evaluation target recorded data is moved to the related data group, second recorded data included in the unrelated data group is moved to the unknown data group.

8. The recorded data processing method according to claim 5, wherein the time signals are audio signals representing the temporal changes in the audio.

9. The recorded data processing method according to claim 5, wherein in the calculating of the time difference, a plurality of candidate values for the time difference between the time signals representing the temporal changes of the recording target in the two pieces of recorded data of the N recorded data pairs are respectively identified, and one of the plurality of candidate values is identified as the time difference.

10. A recorded data processing device, comprising:

an electronic controller configured to:

calculate a time difference between time signals representing temporal changes of a recording target in two pieces of recorded data of each recorded data pair of N recorded data pairs, wherein N is greater than or equal to 3, each recorded data pair of the N recorded data pairs is formed by the two pieces of the recorded data that are adjacent to each other, the two pieces of the recorded data belongs to N pieces of the recorded data arranged cyclically, and the N pieces of the recorded data each represents the recording target including at least one of audio or an image; and evaluate whether or not the recorded data includes one piece of recorded data having no relevance in terms of one of content or time to other pieces of the recorded data among the N pieces of the recorded data, according to a total value of N time differences calculated for the N recorded data pairs, wherein the time difference is calculated for each recorded data pair of the N pieces of the recorded data including N−1 pieces of the recorded data having relation to each other and the one piece of the recorded data having unknown relation to the N−1 pieces of the recorded data, and when the recorded data is evaluated as including the one piece of the recorded data having no relevance among the N pieces of the recorded data, the one piece of the recorded data is determined to be recorded data having no relation to the N−1 pieces of the recorded data.

11. A recorded data processing device, comprising:

an electronic controller configured to:

sequentially select evaluation target recorded data from an unknown data group including a plurality of pieces of recorded data each representing a recording target including at least one of audio or an image;

calculate, at each time of selection of the evaluation target recorded data, for each of N recorded data pairs each formed by two pieces of recorded data that are adjacent to each other when N pieces of recorded data are arranged cyclically, the N pieces of recorded data including a related data group including the plurality of pieces of recorded data each representing the recording target including the at least one of the audio or the image and having relation to each other and the evaluation target recorded data, a time difference between time signals representing temporal changes of the recording target in the two pieces of recorded data of each recorded data pair, wherein N is a natural number of three or more;

evaluate, at each time of the selection of the evaluation target recorded data, presence or absence of relation of the evaluation target recorded data to the related data group according to a total value of N time differences calculated for the N recorded data pairs; and add the evaluation target recorded data to the related data group when the relation is affirmed.

* * * * *